United States Patent [19]

Lee

[11] 4,136,135

[45] Jan. 23, 1979

[54] STYRENE/MALEIC ANHYDRIDE COPOLYMERS

[75] Inventor: Yoon C. Lee, Springfield, Mass.

[73] Assignee: Monsanto Company, St. Louis, Mo.

[21] Appl. No.: 773,888

[22] Filed: Mar. 3, 1977

[51] Int. Cl.$^2$ .................... C08L 11/00; C08L 23/28; C08L 35/06

[52] U.S. Cl. .............................. 260/874; 260/897 C; 260/890; 260/45.7 R; 260/45.7 RT; 260/45.75 R; 260/45.75 D; 260/45.75 B

[58] Field of Search .......... 260/890, 45.7 R, 45.7 RL, 260/75.75 B, 75.75 D, 45.75 F, 45.75 K, 45.75 R, 897 C, 874

[56] References Cited

U.S. PATENT DOCUMENTS

| | | | |
|---|---|---|---|
| 3,162,613 | 12/1964 | Tousignant | 260/45.7 R |
| 3,326,832 | 6/1967 | Rauschenbach et al. | 260/890 X |
| 3,639,298 | 2/1972 | Lister et al. | 260/45.7 R |
| 3,641,212 | 2/1972 | Narayana et al. | 260/893 |
| 3,700,650 | 10/1972 | Hane et al. | 260/890 |
| 3,723,139 | 3/1973 | Larkin et al. | 260/45.75 R |
| 3,869,420 | 3/1975 | Mathis et al. | 260/45.7 R X |
| 3,998,783 | 12/1976 | Whelan, Jr. | 260/45.75 A |
| 4,028,335 | 6/1977 | Fox | 260/45.75 B |

*Primary Examiner*—Carman J. Seccuro
*Attorney, Agent, or Firm*—D. Bennett; J. C. Logomasini; S. M. Tarter

[57] ABSTRACT

A polymer composition comprising a styrene/maleic anhydride copolymer, a halogen-containing rubber, a halogenated aromatic flame-retardant, a flame-retardant synergist and a smoke suppressant comprising a mixture of dawsonite, calcium oxide and a magnesium compound. Such polymers have reduced combustibility and evolve less smoke when burned.

12 Claims, No Drawings

STYRENE/MALEIC ANHYDRIDE COPOLYMERS

BACKGROUND OF THE INVENTION

1. Field of the Invention

The present invention relates to styrene/maleic anhydride copolymers which are formulated to obtain compositions of reduced combustibility and which evolve less smoke during combustion.

2. Description of the Prior Art

Styrene is a term used herein to describe vinylaromatic monomers generally such as styrene itself as well as ring and side chain substituted derivatives like alpha-methylstyrene and/or chlorostyrene.

The preferred styrene/maleic anhydride polymers used in the invention are those in which the styrene is polymerized with from 5 to 30 percent by weight of the copolymerized monomers of maleic anhydride.

Such styrene/maleic anhydride (S/MA) copolymers are conventionally compounded with a halogen-containing component to reduce their flammability. At the combustion temperature of the polymer, this component releases halogen and inhibits the spread of any flame by a vapor-phase free-radical mechanism.

However, this result can also be achieved by cooling down the pyrolysis zone through the incorporation of an additive which decomposes with absorption of large amounts of heat with a consequent reduction of the pyrolysis zone temperature and the rate at which volatiles are produced.

In many formulations of this type, both mechanisms are operative since the latter mechanism is of course also effective in reducing smoke. Typical additives having this latter effect are dawsonite, ($NH_4$ or $NaAl(OH)_2 CO_3$), hydrotalcite, $Mg_6Al_2COOH)_{16.4}H_2$), magnesium hydroxide and aluminum hydroxide, magnesium carbonate and magnesium borate.

Since typically these additives are less efficient than halogen containing additives, they are conventionally used in larger quantities, often up to 50 percent by weight of the polymer composition. For this reason, they are often considered as fillers, as well as smoke suppressants.

A real need exists in the field of compositions comprising styrene copolymers incorporating a halogen-containing component, which compositions begin to release halogen at temperatures above about 300° C., for an effective smoke suppressant additive formulation that is effective in cooling the pyrolysis area so as to reduce smoke evolution while at the same time not inhibiting the effectiveness of the halogen in controlling vapor phase flame propagation mechanisms. This need is accented by the increasing number of laws and regulations relating to the combustion characteristics of polymers which go into items of household furniture, such as radios and television cabinets, tables, chairs, appliance housings, and other related uses and the increasing awareness that the presence of heavy smoke is significant contributory factor in many fires involving loss of life.

Typical S/MA copolymer compositions of reduced combustibility are described in co-pending application Ser. No. 644,491. The compositions disclosed therein comprise:

A. a rubber modified copolymer of a styrene monomer and maleic anhydride containing from 7 to 25 percent by weight of maleic anhydride based on the weight of the copolymer; wherein the rubber is selected from the group consisting of polyepichlorohydrin rubbers, polychloroprene rubbers, chlorinated polyethylene rubbers and ethylene vinyl acetate rubbers; wherein the amount of rubber used is in the range of from 1 to 30 percent by weight based on the weight of the styrene/maleic anhydride copolymers; with the proviso that when using an ethylene vinyl acetate rubber, the maleic anhydride content of the polymer is at least 10 percent by weight;

B. from 7.5 to 15 percent by weight, based on the total weight of the composition, of an aromatic bromine compound which will provide at least 6 percent by weight of bromine to the composition;

C. from 3 to 12 percent by weight, based on the total weight of the composition of a metal oxide selected from the group consisting of $Sb_2O_3$, $Bi_2O_3$, $MoO_3$, $SnO_2$ and $WO_3$;

D. from 3 to 25 percent by weight, based on the total weight of the composition of a smoke suppressant selected from the group consisting of dawsonite, magnesium carbonate, alumina trihydrate, calcium carbonate, magnesium borate and mixtures thereof.

Such polymers have flame-spread ratings of at least V-1 as determined by the UL-94 test and smoke evolution ratings of less than 450 Dm (flaming).

A way has now been found of reducing the smoke evolution of S/MA copolymers reinforced with a halogen-containing rubber, that is startlingly effective and dramatic in the degree of improvement obtained.

SUMMARY OF THE PRESENT INVENTION

The present invention provides a polymer composition of reduced combustibility which comprises:

A. a styrene/maleic anhydride copolymer;
B. a halogen-containing rubber;
C. a halogenated aromatic flame retardant;
D. a metal oxide flame retardant synergist; and
E. a total of from 15 to 25 parts of a smoke suppressant combination of from 2 to 10 parts each of:
   i. dawsonite,
   ii. calcium oxide; and
   iii. a magnesium compound selected from magnesium carbonate, magnesium borate and magnesium oxide.

wherein the number of parts of (ii) is at least one quarter the sum of the number of parts of (i), (ii) and (iii), all parts being by weight of the total polymeric composition.

The term styrene as used in the present invention is understood to include styrene, alpha-methylstyrene, and halogenated styrenes such as o-, p-, and m-monochlorostyrenes, o-, p-, and m-monobromostyrenes, and other ring-substituted styrenes such as 2-methylstyrene, etc. The amount of styrene monomer used in the present invention is preferably from 70 to 95 percent by weight based on the weight of the total monomers. Up to 50 or 60 percent and preferably from 10 to 49 percent by weight of the styrene monomer can be replaced by other suitable monomers such as acrylonitrile, methacrylonitrile, methyl-methacrylate, tribromophenyl acrylate and tribromoneopentyl methacrylate.

The amount of maleic anhydride in the S/MA copolymer is in the range of from 5 to 30 parts based on the total weight of styrene and maleic anhydride and in practice it is found that from 10 to 25 parts by weight gives very satisfactory results.

The monomers may be copolymerized and then blended with the grafted or ungrafted halogen-containing rubber or alternatively they may be polymerized in the presence of the rubber in which case there will be a certain amount of the copolymer formed as a graft on the surface of the rubber.

Taken overall the preferred polymer compositions of the invention comprise from 40 to 60 parts of the S/MA copolymer and from 10 to 25 parts of the halogenated rubber.

The S/MA polymers of the present invention are prepared by conventional mass or solution polymerization techniques.

The polymers used in the present invention are compounded with various additives in order to obtain the required reduced combustibility and smoke evolution properties. A description of the preferred additives is set forth below.

HALOGEN ADDITIVE

The preferred halogenated flame retardant additives used with the S/MA copolymers are those which contain one or more bromine atoms attached to an aromatic nucleus. One such class of these compounds may be represented by the following general formula:

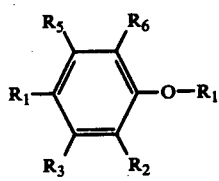

in which $R_1$ is an aromatic group which may be brominated and/or chlorinated or a straight chain or branched alkyl group containing from 2 to 12 carbon atoms and may contain an OH group, and $R_2$ to $R_6$ stand for a member of the group consisting of hydrogen, chlorine and bromine, said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether, and decabromodiphenylether. The halogen atoms of these diaromatic ethers may be distributed in any arrangement on the aromatic rings.

Examples of suitable aromatic-aliphatic ethers are the 2-ethylhexyl-, n-octyl, nonyl-, butyl-, dodecyl-, and 2,3-dioxopropyl ethers of tribromophenyl, tribromochlorophenyl and tribromodichlorophenyl. The most preferred compound is decabromodiphenyl ether. Other suitable aromatic bromine compounds are well known to those skilled in the art or will become obvious upon reading the present specification.

Other suitable aromatic bromine compounds are described in U.S. Pat. Nos. 3,833,538; 3,849,369; British Pat. No. 1,372,120 and West German Patent Publication Nos. 2,328,517, 2,328,520 and 2,328,535, which are incorporated herein by reference.

The amount of halogenated flame-retardant additives used is in the range of 7.5 to 15 percent by weight, preferably 7.5 to 12 percent by weight in order to provide an effective amount of halogen. The minimum effective level of bromine is about 3 percent by weight based on the weight of the polymer composition.

SYNERGISTS

Examples of synergists which may be used in combination with the halogen flame retardant additive in order to obtain improved combustion properties include metal oxides such as $Sb_2O_3$, $Bi_2O_3$, $MoO_3$, $SnO_2$, $WO_3$ and the like. The preferred metal oxide is $Sb_2O_3$. These metal oxides (especially antimony oxide) function as synergists in improving the efficiency of the halogen in imparting improved resistance to combustion to the above mentioned polymers. The amount of metal oxide used with the polymers of this invention will be from 1 to 15 percent by weight, preferably 3 to 12 percent by weight, based on the total weight of the formulated composition.

SMOKE SUPPRESSANTS

The smoke suppressant combination of the present invention comprises (i) dawsonite, (ii) calcium oxide and (iii) a magnesium compound selected from the group consisting of magnesium carbonate, magnesium borate and magnesium oxide.

The dawsonite can be the ammonium dawsonite [$NH_4Al(OH)_2 CO_3$] or the sodium dawsonite [$NaAl(OH)_2CO_3$], with the latter preferred.

The magnesium compound that is usually preferred is magnesium carbonate with the oxide perhaps the least desirable of the three alternatives.

The amounts of each of the three components is from 2 to 10 parts by weight based on the total polymer composition weight with the limitation that there are at least one quarter the number of parts of calcium oxide as the sum of the parts of all three components. A particularly effective combination is provided by 5–10 parts of dawsonite, and 5 parts each of calcium oxide and magnesium carbonate. Most frequently, the preferred parts are from 4–6 parts of each with equal parts of all three giving very good results in practice.

Although the theory is not fully established and it is not intended that the invention be limited in any way by the explanation hereinafter set forth, it is believed that the calcium oxide component is the most important feature of the smoke suppressant combination since it appears to react with the water released by the dawsonite at temperatures of about 300°–320° C. (before pyrolysis of the polymer begins) so that at the higher temperatures it can be released to cool down the pyrolysis zone and inhibit the evolution of smoke and volatiles.

Since the water from the dawsonite is retained in a usable form in the composition it is not necessary to use the very large quantities that characterize the use of dawsonite in the prior art as a smoke suppressant. This is a decided advantage since it has been found that a large amount (about 25 percent by weight of the composition was frequently used to achieve very low smoke polymers) of dawsonite leaves on decomposition a high proportion of highly basic oxides in the composition. These react with the halogen generated upon burning and diminish the effectiveness of the halogen containing flame-retardant additives.

The present invention therefore provides an excellent method of reducing smoke from a burning polymer without the use of excessive amounts of smoke suppressants that can reduce flame retardant effectiveness and can also adversely effect the physical properties of the resultant polymer composition.

RUBBER MODIFIERS

The preferred polymeric compositions of the present invention contain from 1 to 30 percent and more preferably from 5 to 25 percent by weight of a halogen-containing rubber component which is used to strengthen or toughen the S/MA copolymer. Examples of the rubber components used include polymers and copolymers of chloroprene, epichlorohydrin, and chlorinated polyethylene.

The rubbery component may be incorporated into the matrix polymer by any of the methods which are well known to those skilled in the art, e.g., direct polymerization of monomers, grafting the monomers onto the rubbery backbone, forming a polyblend of a rubber graft polymer with a matrix polymer, etc.

Where the rubber is present in the form of a grafted rubber, the amount present is calculated on the basis of the weight of the rubber substrate.

The rubber components are halogenated rubbers such as epichlorohydrin rubbers, polychloroprene rubbers and chlorinated polyethylene rubbers. The chlorinated rubbers provide additional halogen to the system while the epichlorohydrin have the advantage of lower smoke evolution.

The polychloroprene rubber component useful in the present invention can be polychloroprene or a copolymer of chloroprene and at least one other monomer such as butadiene, acrylonitrile, methacrylonitrile, styrene, ring-substituted halostyrene, alpha-halostyrene, ring-substituted alkylstyrene, alpha-alkylstyrene, vinyl chloride, etc. The amount of comonomer used is in the range of 0 to 20 percent based on the weight of polychloroprene rubber copolymer.

Polychloroprene rubbers are commercially available as solid rubbers, rubber latices (also referred to as emulsions) and solutions. The polychloroprene rubbers used in the present invention are in solid form or in organic solvent solutions. The chloroprene rubber is crosslinked either before or during processing in order to maintain its particulate nature. Chloroprene rubbers are available from the E. I. duPont de Nemours and Company, Wilmington, Del. and from Petro-Tex Chemical Corporation of Houston, Tex.

The epichlorohydrin rubbers which are the preferred rubber components are polyepichlorohydrin and copolymers of epichlorohydrin with alkylene oxides such as ethylene and propylene oxides. These rubbers are available commercially as Hydrin Elastomers from B. F. Goodrich Chemical Company.

The rubber component is selected to provide a balance of good physical properties such as impact and gloss. Ungrafted rubber can be used in the present invention. However, when using polychloroprene, rubber which has been grafted with a polymer composition similar to that used for the matrix polymer is preferred. The grafted rubber provides better impact strength and fire retardancy because the graft improves the degree of dispersion of the polychloroprene in the polyblend.

Polychloroprenes are conventionally grafted by dissolving or dispersing the rubber in the monomers to be grafted onto the rubber. The percent of monomer grafted onto the polychloroprene rubber can be varied from about 10 to 100 percent depending on the properties desired. The percent graft is defined as the weight percent of monomers grafted onto the rubber particle, based on the weight of the rubber, e.g., 100 grams of rubber grafted with 100 grams of monomer has 100 percent of grafted monomers. The preferred graft level range is from 10 to 50 percent in order to obtain optimum compatibility and good gloss. Preferably, the grafted rubber has a particle size in the range of from 0.1 to 20 microns, more preferably from 1 to 10 microns for optimum gloss and toughness.

Up to 50 percent of the weight of the halogen-containing rubber can be replaced by a non-halogen containing rubber such as polybutadiene rubbery copolymers of butadiene, neoprene and the like. This may be done to achieve the optimum rubber particle size distribution for toughness but it is not generally preferred since it reduced the amount of available halogen for flame-retardance.

The type and amount of monomers described above in reference to the preparation of the S/MA copolymer are preferred for use in the graft polymerization of the polychloroprene rubbers though this is not essential and the rubber can be grafted with other proportions and even other monomers if desired.

TEST PROCEDURES

Underwriter's Laboratory UL-94 Test [1]

Combustion properties are measured using the "Test for Flammability for Plastic Materials — UL-94", Sept. 17, 1973. The test is carried out on test specimens 6 × ½ × 1/8 inch. When other sample thicknesses are used the stated thickness is given.

[1] The numerical flame spread ratings reported herein are not intended to reflect hazards presented by the presently claimed polyblends or any other materials under actual fire conditions.

The test specimen is supported from the upper end, with longest dimension vertical, by a clamp on a ring stand so that the lower end of the specimen is ⅜ inch above the top of the burner tube. The burner is then placed remote from sample, ignited, and adjusted to produce a blue flame, ¾ inch in height.

The test flame is placed centrally under the lower end of the test specimen and allowed to remain for 10 seconds. The test flame is then withdrawn, and the duration of flaming or glowing combustion of the specimen is noted. If flaming or glowing combustion of the specimen ceases within 30 seconds after removal of the test flame, the test flame is again placed under the specimen for 10 seconds immediately after flaming combustion of the specimen stops. The test flame is again withdrawn, and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flaming particles are considered to be those capable of igniting the cotton fibers.

The duration of flaming or glowing combustion of vertical specimens after application of the test flame, average of five specimens (10 flame applications) shall not exceed 25 seconds (maximum not more than 30 seconds), and the portion of the specimen outside the clamp shall not be completely burned in the test.

Materials which comply with the above requirements and do not drip any flaming particles or droplets during the burning test will classify as V-1 according to the nomenclature used in the UL-94 test.

Class V-0 is given to materials wherein the duration of flaming averages less than 5 seconds under the conditions above with no ignition burning more than 10 seconds.

SMOKE EVOLUTION TESTS

The method used for measuring smoke evolution is that described in D. Gross, J. J. Loftus and A. F. Robertson, "Method for Measuring Smoke from Burning Materials", Symposium on Fire Test Methods — Restraint and Smoke, 1966, AST STP 422, Am. Soc. Testing Mats., 1967, p. 166. The results of the test are quoted as a "Dm (flaming)" value which is calculated as described in the above test method. A high "Dm" value indicates a lot of smoke was generated so that the most desirable formulations have as low a Dm value as possible.

IMPACT STRENGTH TEST

It is important that the additives used result in no unacceptable deterioration in impact properties. For this reason the Izod impact test performance, as measured by the method described in ASTM D 2561-73, is given for most of the polymer compositions tested.

The following examples are set forth in illustration of the present invention and are not to be construed as a limitation thereof. Unless otherwise indicated all parts and percentages are by weight.

In the Examples that follow the components described were compounded together in the indicated proportions and tested for impact strength, fire retardance and smoke production. The results are recorded in Table I below.

Notes

In the following tables the art terms used have the meanings hereinbelow set forth.

80/20-S/MA — a copolymer of styrene with maleic anhydride in 80:20 proportions by weight.

80/20-S/MA grafted onto Diene 55 — A copolymerizable mixture of styrene and maleic anhydride polymerized in the presence of Diene 55 (see below) in given proportions. Amount of rubber is 10% of total monomer weight.

80/20-S/MA grafted onto HYDRIN — A copolymerizable mixture of styrene and maleic anhydride polymerized in the presence of a HYDRIN rubber (see below) in given proportions. Amount of rubber is 10% of total monomer weight.

Hydrin — an epichlorohydrin rubber supplied by B. F. Goodrich under that trade name.

Triblock — An experimental block copolymer rubber comprising 20 parts of styrene, 20 parts of butadiene and 60 parts of caprolactone supplied by Phillips Petroleum.

Diene 55 — A polybutadiene supplied by Firestone under that trade name.

Dawsonite — $NaAl(OH)_2CO_3$

FR-300BA — A flame retardant obtained commercially from Dow Chemical Company which is a brominated bisphenol ether.

EXAMPLES 1–9

The results obtained in these Examples are set out in Table I and illustrate the effect of omitting any one of the components from the smoke suppressant mixture. The lowest Dm value obtained with a 2-component smoke suppressant system is 477 whereas the highest with a 3-component system according to the invention is 358.

Table I

| Ex. | 80/20 S/MA | Composition Hydrin | Triblock | Diene 55 | Smoke Suppressant Dawsonite | $MgCO_3$ | CaO | Flame Retardant FR-300 BA | $Sb_2O_3$ | Physical Properties Izod | DM Flaming | UL-94 |
|---|---|---|---|---|---|---|---|---|---|---|---|---|
| 1 | 57 | 20 | — | — | 5 | 5 | — | 9 | 4 | brittle | 495 | V-0 |
| 2 | 52 | 20 | — | — | 5 | 5 | 5 | 9 | 4 | 0.6 | 297 | V-0 |
| 3 | 47 | 20 | — | — | 10 | 5 | 5 | 9 | 4 | ND | 321 | V-0 |
| 4 | 61.5 | 20 | — | — | 5 | 5 | — | 4.5 | 4 | 0.52 | 528 | V-0 |
| 5 | 58.5 | 20 | — | — | 5 | 5 | — | 7.5 | 4 | 0.44 | 477 | V-0 |
| 6 | 54.5 | 20 | — | — | 10 | — | 2.5 | 9 | 4 | 0.6 | 547 | V-0 |
| 7 | 47 | 20 | — | — | 10 | 5 | 5 | 9 | 4 | 0.59 | 354 | V-0 |
| 8 | 45 | 15 | 10 | — | 5 | 5 | 5 | 10 | 5 | 0.75 | 292 | V-0 |
| 9 | 45 | 20 | — | 5 | 5 | 5 | 5 | 10 | 5 | 0.53 | 358 | V-0 |

ND signifies "Not determined".

EXAMPLES 10–13

The Examples use a styrene/maleic anhydride polymerized in the presence of a diene rubber. Example 10 shows the Dm value with no smoke suppressants; Examples 11 and 12, the effect of a smoke suppressant omitting the calcium oxide on the DM value and Example 13 shows the 3-component system of the invention with a very low Dm Value. Examples 10–13 are summarized in Table II.

TABLE II

| Ex. | 80/20 S/MA Grafted on Diene-55 | Hydrin | Smoke Suppressant Dawsonite | $MgCO_3$ | CaO | Flame Retardant BA | $Sb_2O_3$ | DM Flaming |
|---|---|---|---|---|---|---|---|---|
| 10 | 87 | | — | — | — | 9 | 4 | 654 |
| 11 | 72 | | 5 | 10 | — | 9 | 4 | 604 |
| 12 | 72 | | 10 | 5 | — | 9 | 4 | 474 |
| 13 | 60 | 12 | 5 | 5 | 5 | 9 | 4 | 273 |

EXAMPLES 14–19

These Examples show variation of DM with the smoke suppressant combination when the polymer is an S/MA polymer polymerized in the presence of a Hydrin rubber. (see Table III)

TABLE III

| Ex. | 80/20 S/MA Grafted on Hydrin | Hydrin | Smoke Suppressant Dawsonite | MgO₃ | CaO | Flame Retardant FR-300 BA | Sb₂O₃ | Physical Properties Izod | DM Flaming | UL-94 |
|---|---|---|---|---|---|---|---|---|---|---|
| 14 | 72 | — | — | 15 | — | 9 | 4 | brittle | 321 | Fail |
| 15 | 72 | — | — | — | 15 | 9 | 4 | ← Too Brittle to fabricate → | | |
| 16 | 72 | — | 15 | — | — | 9 | 4 | ← → | | |
| 17 | 77 | — | 5 | 5 | — | 9 | 4 | <0.3 | 571 | V-0 |
| 18 | 60 | 12 | 5 | 5 | 5 | 9 | 4 | 0.55 | 250 | V-0 |
| 19 | 67 | — | 10 | 5 | 5 | 9 | 4 | <0.3 | 272 | V-0 |

EXAMPLES 20-24

These Examples show the dramatic changes in Dm that are obtained when the smoke suppressant combination according to the invention is used and the superior DM results obtained if the S/MA polymer is formed in the presence of the rubber rather than blended therewith. Examples 20-24 are summarized in Table IV below.

TABLE IV

| Ex. | 80/20 S/MA | 80/20 S/MA Grafted on Hydrin | Hydrin | Smoke Suppressant Dawsonite | MgCO₃ | CaO | Flame Retardant FR-300 BA | Sb₂O₃ | Physical Properties DM Flaming | UL-94 |
|---|---|---|---|---|---|---|---|---|---|---|
| 20 | 57 | — | 20 | 5 | 5 | — | 9 | 4 | 503 | V-O |
| 21 | 54.5 | — | 20 | 10 | — | 2.5 | 9 | 4 | 549 | V-O |
| 22 | 47 | — | 20 | 10 | 5 | 5 | 9 | 4 | 354 | V-O |
| 23 | — | 67 | — | 10 | 5 | 5 | 9 | 4 | 272 | V-O |
| 24 | 67 | — | 20 | — | — | — | 9 | 4 | 650 | V-O |

From the foregoing Examples it can clearly be seen that the effect of the presence of calcium oxide in the smoke suppressant mixture is quite startling. Comparing Examples 1 and 2 it is seen that the effect of adding 5 parts of CaO is to reduce the Dm (flaming) value by 200 and to reduce the brittleness to a point where a significant Izod test value could be obtained.

It is also significant that the *lowest* V-0 rated polymer without CaO as a component therein has a Dm (flaming) value of 474 wherein the *highest* Dm (flaming) value obtained for a V-0 polymer containing the smoke suppressant combination of the invention is 358.

The series of Examples with different parts of the composition varying all go to demonstrate the unique and unexpected advantage of the smoke suppressant combination of the invention.

It is apparent that many minor variations could be made in the compositions of the invention without departing from the essential inventive concept. It is intended that all such variations be embraced within the purview of this invention.

What is claimed is:

1. A polymer composition with reduced combustibility which comprises:
   A. from 40 to 60 parts of a styrene/maleic anhydride compolymer;
   B. from 1 to 30 parts of a halogen-containing rubber selected from the group consisting of homopolymers and copolymers of chloroprene, epichlorohydrin rubber and chlorinated polyethylene;
   C. from 7.5 to 15 parts of a halogenated aromatic flame retardant additive;
   D. from 1 to 15 parts of a metal oxide flame retardant synergist; and
   E. a total of from 15 to 25 parts of a smoke suppressant combination consisting of from 2 to 10 parts each of
      (i) dawsonite,
      (ii) calcium oxide, and
      (iii) a magnesium compound selected from magnesium carbonate, magnesium borate and magnesium oxide,
   wherein the total number of parts of (ii) is at least one quarter the sum of the parts of (i), (ii) and (iii), all parts being by weight of the polymer composition.

2. A polymer composition according to claim 1 in which the copolymer is formed from styrene and maleic anhydride in a weight ratio of from 95:5 to 70:30.

3. A polymer composition according to claim 1 which comprises from 5 to 25 parts by weight of a halogen-containing rubber.

4. A polymer composition according to claim 1 in which the smoke suppressant combination comprises from 3 to 10 parts of dawsonite and from 3 to 6 parts each of calcium oxide and magnesium carbonate, all parts being by weight of the total polymer composition.

5. A polymer composition of reduced combustibility which comprises:
   A. from 40 to 60 parts of a styrene/maleic anhydride copolymer;
   B. from 5 to 25 parts of a halogenated rubber selected from the group consisting of homopolymers and copolymers of chloroprene, epichlorohydrin rubbers and chlorinated polyethylene;
   C. from 7.5 to 15 parts of a halogenated aromatic flame-retardant additive;
   D. from 1 to 15 parts of a metal oxide flame-retardant synergist;

E. from 15 to 20 parts of a smoke suppressant combination consisting of:
   (i) 4 to 6 parts of dawsonite;
   (ii) from 4 to 6 parts of calcium oxide, and
   (iii) from 4 to 6 parts of magnesium carbonate,
   all parts being by weight of the polymer composition.

6. A polymer composition according to claim 5 in which the copolymer consists of styrene and maleic anhydride in proportions by weight of from 75:25 to 90:10 styrene to maleic anhydride.

7. A polymer composition according to claim 5 in which the halogenated rubber is an epichlorohydrin rubber.

8. A polymer composition according to claim 5 in which the metal oxide flame-retardant synergist is antimony trioxide.

9. A polymer composition according to claim 5 in which the smoke suppressant additive consists of from 4 to 6 parts of dawsonite, calcium oxide and magnesium carbonate, all parts being by weight of the total polymer composition.

10. A polymer composition of reduced combustibility which comprises:
   A. from 40 to 60 parts of a polymer of styrene and maleic anhydride in respective proportions of from 70:30 to 90:10;
   B. from 10 to 25 parts of an epichlorohydrin rubber;
   C. from 7.5 to 12 parts of a halogenated flame-retardant additive
   D. from 3 to 12 parts of antimony trioxide; and
   E. from 15 to 20 parts of a smoke suppressant combination of
      (i) 5 to 10 parts of dawsonite;
      (ii) 5 parts of calcium oxide; and
      (iii) 5 parts of magnesium carbonate,
      wherein all parts are by weight of the polymer composition.

11. A method of reducing the smoke evolved by a flaming polymer composition comprising from 40 to 60 parts of a styrene/maleic anhydride copolymer, from 1 to 30 parts of a halogen-containing rubber selected from the group consisting of homopolymers and copolymers of chloroprene, epichlorohydrin rubbers and chlorinated polyethylene, from 7.5 to 15 parts of a halogenated aromatic flame-retardant additive and from 1 to 15 parts of a metal oxide flame-retardant synergist, which comprises incorporating therein a total of 15 to 25 parts by weight of the composition of a smoke suppressant combination consisting of from 2 to 10 parts each of
   (i) dawsonite,
   (ii) calcium oxide, and
   (iii) a magnesium compound selected from magnesium carbonate, magnesium borate and magnesium oxide,
wherein the total number of parts of (ii) is at least one quarter the sum of the parts of (i), (ii) and (iii), all parts being by weight of the polymer composition.

12. A method according to claim 11 wherein the smoke suppressant combination comprises from 5 to 10 parts of dawsonite and 5 parts each of calcium oxide and magnesium carbonate.

* * * * *